(12) United States Patent
Nehez (10) Patent No.: US 7,722,701 B2
(45) Date of Patent: May 25, 2010

(54) METHOD AND SYSTEM FOR HANDLING GAS DIFFUSION THROUGH THE ENVELOPES OF AIRSHIPS AND BALLOONS

(76) Inventor: Imre Nehez, Korona u., Papa (HU) H-8500

( * ) Notice: Subject to any disclaimer, the term of this patent is extended or adjusted under 35 U.S.C. 154(b) by 785 days.

(21) Appl. No.: 10/599,008

(22) PCT Filed: Mar. 11, 2005

(86) PCT No.: PCT/HU2005/000027

§ 371 (c)(1),
(2), (4) Date: Sep. 18, 2006

(87) PCT Pub. No.: WO2005/090154

PCT Pub. Date: Sep. 29, 2005

(65) Prior Publication Data

US 2007/0194176 A1 Aug. 23, 2007

(30) Foreign Application Priority Data

Mar. 19, 2004 (HU) .................................. 0400618
Mar. 10, 2005 (HU) .................................. 0500289

(51) Int. Cl.
*B01D 53/22* (2006.01)
*B64B 1/14* (2006.01)

(52) U.S. Cl. ................. 95/45; 95/47; 95/53; 95/54; 95/55; 95/96; 95/116; 95/148; 95/4; 95/9; 95/11; 95/108; 95/134; 55/385.1; 55/385.4; 244/30; 244/31; 244/126

(58) Field of Classification Search ............... 95/45, 95/47, 51, 52, 53, 54, 55, 90, 96, 116, 127, 95/148; 96/4, 7, 9, 11, 108, 134, 143; 244/30, 244/31, 125, 126; 55/385.1, 385.4; 429/17, 429/19
See application file for complete search history.

(56) References Cited

U.S. PATENT DOCUMENTS 3,185,411 A * 5/1965 Gembe ..................... 244/30
3,754,375 A * 8/1973 Bouchilloux et al. ........ 95/51
3,897,032 A   7/1975 Papst (Continued)

FOREIGN PATENT DOCUMENTS

DE    403834    10/1924

(Continued)

OTHER PUBLICATIONS

English Language Abstract Corresponding to GB 1 348 408.

*Primary Examiner*—Jason M Greene
(74) *Attorney, Agent, or Firm*—Millen, White, Zelano & Branigan, P.C.

(57) ABSTRACT

The subject of the invention is method and envelope structure for handling gas diffusion of airships and other balloons to significantly decrease, respectively fully eliminate envelope diffusion of gases through envelopes of airships and other balloons. During the method according to the invention the gases diffused through the envelope (8, 9) of airships and other balloons are collected into a separator space (2). These gases are separated from the mixture of this separator space by physical and/or chemical action and forwarded back to their sources. The invention is further an envelope structure for handling gas diffusion of airships and other balloons for applying methods according to the invention.

20 Claims, 7 Drawing Sheets

U.S. PATENT DOCUMENTS

| | | | |
|---|---|---|---|
| 4,675,030 A * | 6/1987 | Czarnecki et al. | 95/53 |
| 4,773,617 A | 9/1988 | McCampbell | |
| 5,090,637 A | 2/1992 | Haunschild | |
| 5,224,350 A * | 7/1993 | Mehra | 95/53 |
| 5,259,869 A * | 11/1993 | Auvil et al. | 95/52 |
| 5,632,803 A * | 5/1997 | Stoner et al. | 95/53 |
| 2005/0224638 A1* | 10/2005 | Goodey | 244/30 |
| 2008/0265086 A1* | 10/2008 | Lee | 244/30 |

FOREIGN PATENT DOCUMENTS

| | | |
|---|---|---|
| DE | 2002 06 527 U1 | 8/2002 |
| GB | 17460 | 7/1911 |
| GB | 1 348 408 | 3/1974 |
| GB | 2 196 920 A * | 5/1988 |

\* cited by examiner

METHOD AND SYSTEM FOR HANDLING GAS DIFFUSION THROUGH THE ENVELOPES OF AIRSHIPS AND BALLOONS

The subject of the invention is method and envelope structure for handling gas diffusion of airships and other balloons to significantly decrease, respectively fully eliminate envelope diffusion of gases through envelopes of airships and other balloons. In the diffusion-free envelope structure made for the application of the method the micro-channels of gas penetration are separated by one or more separator spaces, so if the gas spaces of the envelope are treated with active gas separation and other methods, the loss of diffusible filling gases (e.g. hydrogen and helium) respectively the penetration of ambient gases into the gas container space can be prevented.

It is a general problem in the state of art flying structures (airships, lifting balloons and hose-containers), that due to the gases, in given case helium, hydrogen, ammonia, methane, stored in them, the envelope of the gas container space is extremely permeable, penetrable and/or susceptible to create unsafe compounds. Diffusion is meant the two-way penetration of gases through an intact, unbroken envelope. It is not possible to efficiently keep these filling gases safely and without loss in the state of art so-called balloon gas container spaces, applied extensively, using light fabric and plastic films, as well as polymer base canvas as bordering. The continuous envelope loss of diffusion lift gas decreases lift force. A maximum operating time of 100 days without gas supplement can be ensured by the use of the best teflon canvas (tedlar) envelope used currently.

It is also a great problem in the state of art, that due to the so-called partial pressure-resulting from the difference of gas compositions—gases penetrate from the surrounding air e.g. from the atmosphere into the gas container space even against higher mechanical pressure, particularly oxygen, which could create an explosive compound in certain concentration with the hydrogen in the inner space. In addition to it the gases having penetrated will make the balloon structure heavier. The 1,500 square meter surface captive aerostat balloon used for sightseeing on the Budapest Westend terrace made by the English Lindtrand Balloon company lost 650 m$^3$ helium in ten months whereas 100 m$^3$ of oxygen penetrated into its gas container space. Hydrogen used with airships and elevating structures is an extremely permeable and unsafe gas creating hazardous compounds. However use of hydrogen instead of helium or a mixture would be reasonable, as it could be used not only as lift force, but as a fuel gas as well in airships and elevating balloons.

A further advantage of hydrogen use is, that resources are practically endless to produce it (sunshine and water) in a renewable way. On top of that it is ten times cheaper than helium. It can be produced by electro-hydrolysis on board by solar cells and can be used as fuel of airships produced while on the way. A further advantage of these airships of solar hydrogen use is, that hydrogen is burnt in so-called fuel cells producing electric energy directly and it is used in an environmentally-friendly way, burning it into water again. No harmful carbondioxide or nitrogen monoxide are produced, as in case of traditional engines. The only obstacle to its use is flammability, which can be eliminated if envelope diffusion can be prevented. If it is not possible, that more than 2% of oxygen concentration gas compound is created, then there is no fire risk either.

To avoid the drawbacks due to envelope diffusion, envelope becoming heavier, creation of unsafe, flammable gas compounds etc. an elaborate, known solution is the regular cleaning of the inner gas space, during which the penetrated gases are extracted from the lift gas. U.S. Pat. No. 5,090,637 patent description makes known such a method for cleaning helium in the inner gas spaces of airships, which is primarily suitable for extracting oxygen and nitrogen penetrated into the inner gas space. The essence of the method is, that the lift gas of the airship is led through a semi-permeable membrane cleaning unit during continuous circulation, extracting nitrogen and oxygen. The solution can be considered a permanent cleaning of the lift space serving filtering and removal of gases penetrated due to insufficient sealing of envelope. Its drawback is, that it is not suitable for preventing diffusion loss of lift gas, as well as it is very expensive due to the big volume and low concentration of contaminating gases. It can not be applied in every case either.

The most frequently used solution of the problem at present is, that they try to use compact materials of good gas-stopping quality for the envelope. Such a solution is the application of metal-film layers as well as metalizing. This case there are two problems. Firstly there is an unavoidable loss of gas diffused out of the gas container space (gas absorbed into the envelope, then penetrating through it to the outer space). Secondly materials of good sealing capacity are of greater density as well, and it contradicts to the requirement of using materials as light as possible, which is essential in case of certain applications, principally in case of lifting balloons and airships.

It is a fact, that it is not possible to increase the sealing capacity of gas container spaces above a certain extent exclusively by the improvement of characteristics of the material of the envelope by the currently known, so-called passive gas isolation methods including metalizing as well, based on the existence and material features of the envelope. Due to diffusion different gases for example hydrogen, helium, oxygen will always penetrate through the material layers of the envelope.

All the methods in the state of art known and applied so far can be considered passive, because barrage from the surrounding air is ensured only by the existence of the covering material ensuring sealing with degrading features of gas-sealing capacity. Therefore these solutions cannot offer a suitable solution for storing gases in a given container space for long and diffusion-free.

The producers and designers tried to avoid problems of gas diffusion so far unsolvable by balloon constructions. HU 158 904 patent description (applicant Herman Papst) makes known a motor-driven, semi-rigid, steerable airship structure (kiel-type). Problems of gas diffusion are here avoided by using saturated water-steam and water-steam+fuel gas mixture as lift gas instead of hydrogen or helium of much more advantageous characters, which is less diffusible and can be kept within the balloon with little loss.

Such balloons or airships are unfavorable, because the lifting power of steam is significantly less, than that of the helium, not to mention hydrogen, on the other hand the necessity of permanent heating eats up an unnecessarily big amount of energy. The envelope of the airship is made of heat-reflective metalizing fabric+polymer material divided into special chambers and warm air of slight overpressure is circulated in them, heating the inner deflecting wall envelope.

This technical solution—disregarding circulation of overpressure air—can be considered as the improvement of thermic izolation applied and well-known in Rozier type ballons and airships of two lifting spaces (outside helium and inside warm air) (see U.S. Pat. No. 4,773,617 application of 1978). The aim of circulation of overpressure hot air is partly to strengthen the outer envelope, which is essential in aerodynamic efficiency, on the other hand and mainly the pre-heating of the inner wall avoiding input of dry steam into the elevation space of steam to ensure permanent presence of saturated steam near the deflecting wall. The issue of handling 'oxygen in, steam out' does not even come up. This solution can be regarded as thermal active izolation not recognized by the inventor. We can see similar solutions in Hermann Papst's applications of U.S. Pat. No. 3,897,032 and HU 170614.

The solution described in utility model DE 202 06 527 U1 also ment to increase thermal izolation, in which aerogel (foaming material) is used between two polymer layers. This application offers no solution gas diffusion problems neither in its aim, or in its finish, and has no connection with the solution of transfer izolating envelope structure with separator space according to this invention.

Patent GB 191017460 describes a solution to prevent envelope diffusion of balloon structures, during which the porously-rubbered fabric covering of the balloon structure is coated with a tar-like material increasing gas density. The method is a passive solution, which is of preventive nature, however it is not apt to handle gases having penetrated into the space nor for cleaning gas spaces.

Up-to-date airship envelopes are canvas materials made of polymer fabric and polymer coatings with one or more layers combined with co-polymerizatin, lamination. It is characteristic of them, that different material membranes are in contact on the full surface creating a socalled summerizing, inhomogeneous gas diffusion channel. This channel is the complex of molecular gas-routes (molecular paths) thickness directed, perpendicular to the surface (falling into the normal of surface) in the material structure of laminated canvases, foils and other membranes. The canvas consisting of united polymer material layers is interpreted, described and handled according to our invention, as a gas diffusion channel of complex materials.

When working out the solution according to the present invention we aimed to elaborate a technical solution for storing diffusable gases, which can prevent loss of gas of gas container spaces and penetration of other gases into the container space.

We realized, when working out the technical solution according to the invention, that if the envelope of gas container spaces (e.g. airships, lifting balloons and container hoses) is structurized in addition to the traditional passive separation by one or more separator spaces and in them methods, in connection with or without the layers of the material-membrane of the envelope, influencing gas-diffusion are operated intermittently or continuously in an active way then the set aim,—i.e. preventing the gas loss and diffusion—can be achieved.

We also realized, that if the molecular micro-channels of gas intake are disengaged by a properly structurized so-called separator space, as well as this sealing space and/or the bordering material layers are treated with several physical-chemical methods in an active way, i.e. maintained during its working, then gas-diffusion can be regulated, in given case e.g. totally eliminated.

During our experiments for preventing diffusion we furthermore realized, that gas permeability of polymer films used as condenser can be changed depending on frequency, for example by the tension put on the armature. The most probable physical principle of this phenomenon is, that the electric field moves the polarizing segments narrowing, respectively sealing the molecular diffusion paths (micro-channels), furthermore space-narrowing processes of restructuring resulting from rearranging of segments decrease the gas volume sorbing in the micro-cavities.

The invention is a method for handling gas diffusion of airships and other balloons to clean gases diffused through envelopes of airships and other balloons, which is characterized by that, the envelope of gas container spaces, in given case airships, lifting balloons and hose-containers is appropriately structurized in addition to the traditional passive separation by one or more separator spaces and in said envelope, certain methods in connection with or without the layers of the material-membrane of the envelope, influencing gas-diffusion are operated intermittently or continuously in an active way.

During one of the preferred applications of the method according to the invention gases diffused into the multi-layer bordering structure of the envelope are separated by a disjunctive separation, during which the gases having penetrated into the separator space are separated from the mixture of these separator spaces by physical and/or chemical action and forwarded back to their sources.

During another preferred application of the method according to the invention the gases having penetrated into the separator space or spaces—even in small quantities reduced by EDI (Electrical Diffusion Inhibitor)—forming compounds there, are extracted, separated and forwarded back to their sources, by well-known, suitably adapted gas-handling methods and equipment, or in an other way, for example by piping them into a fuel cell are utilized.

During a further preferred application of the method according to the invention two separator spaces are applied in the null-diffusion envelope and the lift space is filled with hydrogen and/or helium.

During a further preferred application of the method according to the invention in case of active isolation envelope structure three separator spaces are applied and the lift space is filled with helium.

During a further preferred application of the method according to the invention during the method electrical gas diffusion inhibitor (EDI) is applied, which is a physical effect in the layers of the material membrane, which is able to decrease absorption and penetration of gases in these layers, in given case it is a static and/or alternating current potential space.

During a further preferred application of the method according to the invention there is physical, respectively chemical action applied and/or included influencing gas-diffusion, in given case gas absorption and/or penetration in minimum one material-membrane and/or separator space.

During a further preferred application of the method according to the invention there is vacuum gas-compound extraction in minimum one of the separator spaces.

During a further preferred application of the method according to the invention there is basic compound gas of positive or negative pressure applied as intermediate gas-trap in minimum one of the separator spaces.

During a further preferred application of the method according to the invention gases having penetrated into any of the separator spaces, forming there compounds are separated by separating methods (disjunctive separation), for example adsorption, chemo-sorption, perm-selective membranes, by liquefaction, fractional destination etc.) are broken down and in given case are led back to their sources or are utilized by other ways.

During a further preferred application of the method according to the invention there is a method influencing gas diffusion, e.g. gas absorption inhibition and/or cavitation filtering of electrokinetics microstructure applied in minimum one of the material membrane layers.

The invention is further an envelope structure for handling gas diffusion of airships and other balloons primarily for applying methods according to the invention, said envelope structure of gas spaces of balloons filled with diffusible gas filling, for example airships, lifting balloons and hose-containers has a bordering space, which is characterized by that, the diffusion-free envelope is a multi-layer gas isolation envelope, which has inner and outer isolation layers and among the said layers there is minimum one gas isolation separator space.

In one of the preferred embodiments of the envelope structure according to the invention there are three isolation layers as well as two separator spaces applied, which form a multi-layer closed envelope around the gas container/lift space from which the inner separator space with filling gas, the choice of material membrane, pressure, handling method etc. joins the gas container space and an outer separator space joins the surrounding air.

In another preferred embodiment of the envelope structure according to the invention three separator spaces around the gas container space and four isolation layers forming the latter separator spaces are arranged in a way, that the third, interval separator space is between the two inner and outer separator spaces and join them.

BRIEF DESCRIPTION OF DRAWINGS

The method and apparatus according to the invention are set forth with the enclosed drawings as follows.

Figure 1:
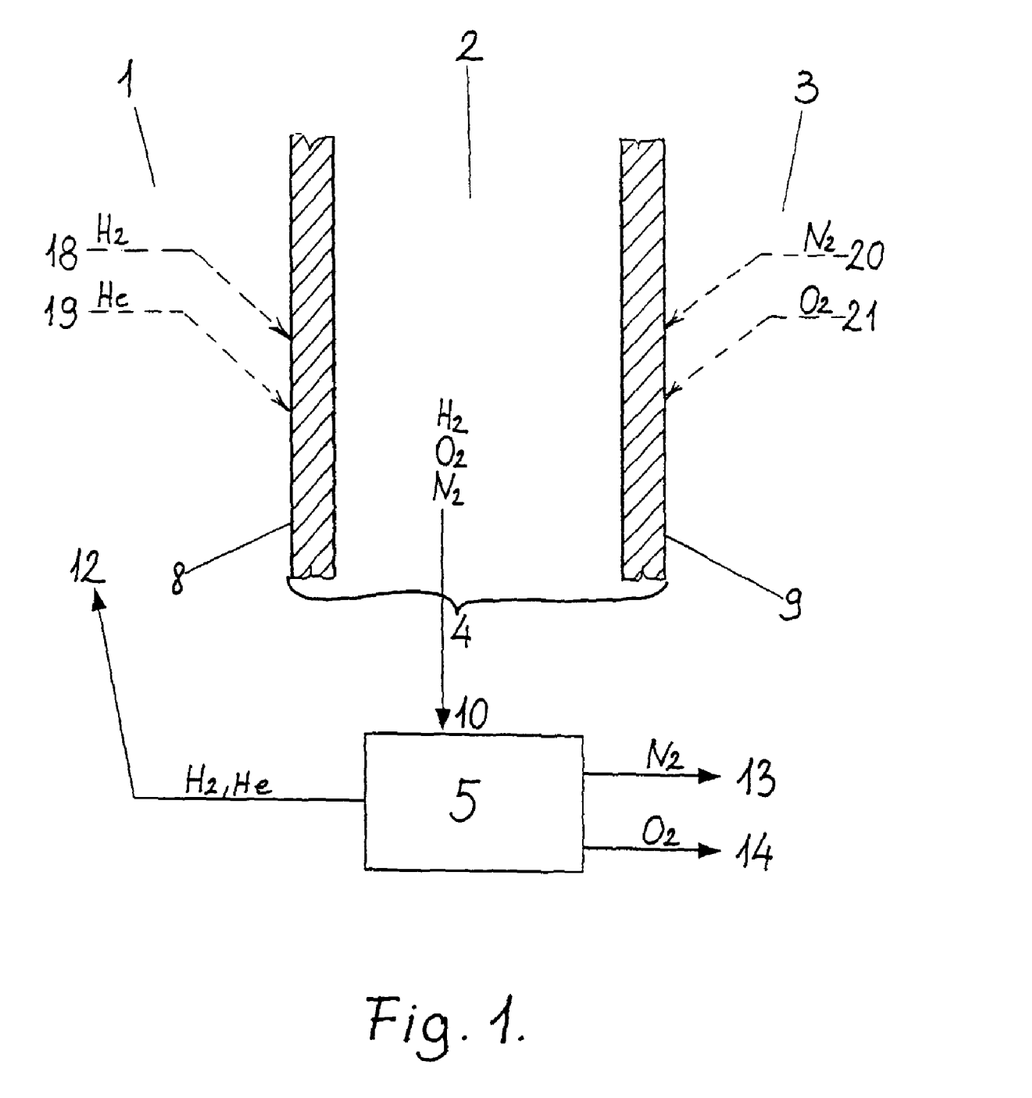
FIG. 1 shows a general theoretical envelope structure arrangement suitable for the application of the method.

FIG. 1 shows a general theoretical envelope structure arrangement suitable for the application of the method. It can be seen in the figure, that the envelope 3 consists of inner isolation layer 8 and outer isolation layer 9 and the separator space 2 between them. The inner isolation layer 8 is located towards the inner gas container space 1 of the balloon, the outer isolation layer 9 is located towards the surrounding air 4. The gas separating apparatus 5 joins the separator space 2 where the gases having penetrated there are firstly separated, then the components of the gas compound are forwarded back to their source-spaces.

In the definite case shown in the figure gas container space 1 contains hydrogen 18 and helium 19, that diffuse through inner isolation layer 8 to a low extent, but continuously towards separator space 2, where they mix with nitrogen 20 and oxygen 21 gases diffusing through the outer isolation layer 9 from the surrounding air 4. The gas separating apparatus 5 removes the gas-compound from the separator space 2 by continuous exhaustion. The components of the mixture separated by well-known physical and chemical processes are forwarded back to their resources. Accordingly the hydrogen 18 and helium 19 retained from separator space 2 is forwarded to the inner gas container space 1 through the lift gas feedback 12, while oxygen 21 gets to surrounding air 4 through oxygen outlet 14. In this arrangement liquefaction of gases followed by fractional distillation is one of the preferable and most ordinary technical solutions of gas separating apparatus 5.

Figure 2:
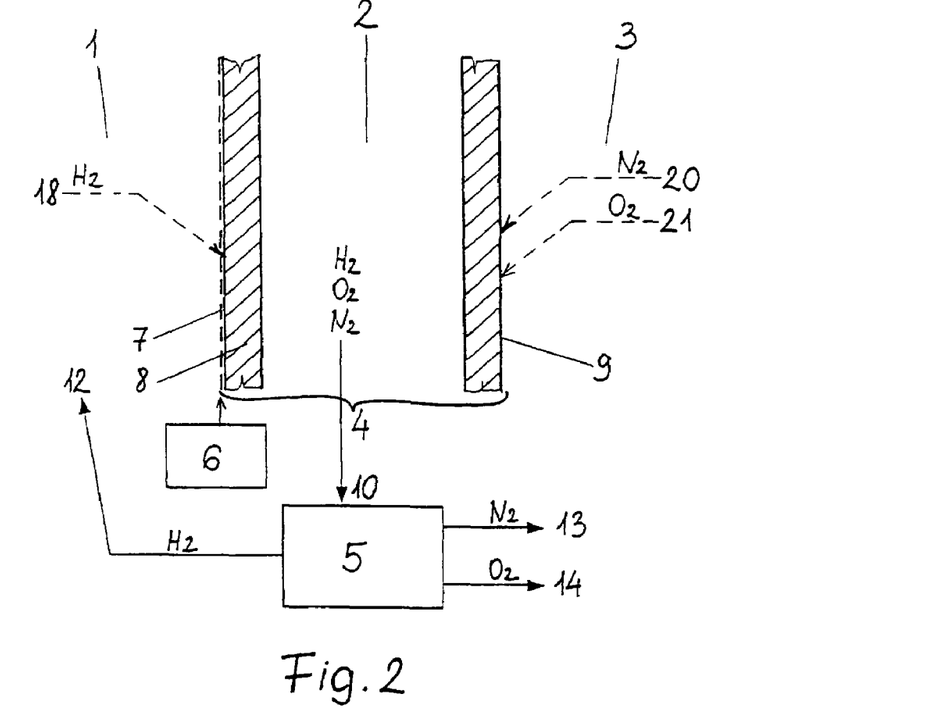
FIG. 2 shows a preferable application of the method according to the invention, an envelope-structure arrangement in case of applying hydrogen in separator space and in gas container space as well.

FIG. 2 shows a preferable application of the method according to the invention, an envelope-structure arrangement in case of applying hydrogen in separator space 2 and in gas container space 1 as well. The apparatus shown in FIG. 2 differs from the base arrangement shown in FIG. 1 in that, that this case on the inner surface of the inner isolation layer 8, or in the material itself of the inner isolation layer 8 metal fibers 7 are applied. This is handled by electrical gas diffusion inhibitor 6 in given case by an active way, which creates and maintains a suitable electric potential space in the inner isolation layer 8. In the definite case shown in FIG. 2 gas container space 1 contains hydrogen 18, that diffuses through inner isolation layer 8 to a low extent, but continuously towards separator space 2, where it mixes with nitrogen 20 and oxygen 21 gases diffusing through the outer isolation layer 9 from the surrounding air 4. The gas separating apparatus 5 removes the gas-compound from the separator space 2 preferably by continuous exhaustion.

Figure 3:
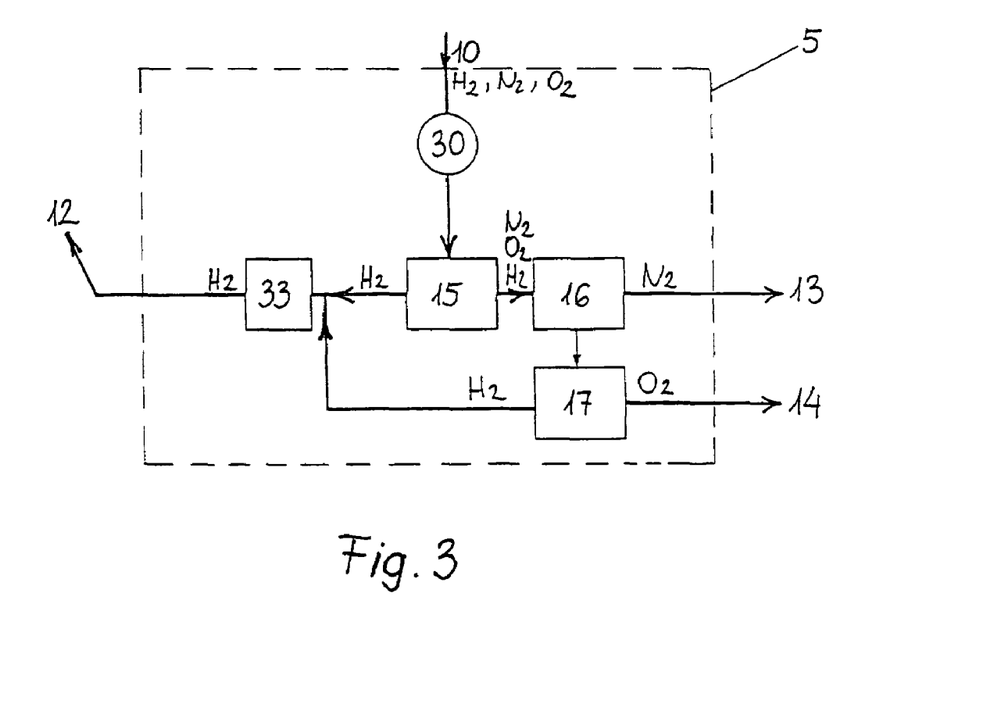
FIG. 3 shows a possible preferable technical solution of the gas separating apparatus shown in FIG. 2.

FIG. 3 shows a possible preferable technical solution of the gas separating apparatus 5 shown in FIG. 2. Here H2+O2+N2 gas-compound risen from separator space 2 is pumped by the gas transferring unit 30 through the gas compound outlet 10 to hydrogen separator 15. In the hydrogen separator 15 oxygen and a part of hydrogen becomes steam. This steam and nitrogen is forwarded to the vapor extraction unit 16 after having been separated from hydrogen. Nitrogen goes to surrounding air 4 through nitrogen outlet 13. The remaining water is broken down to oxygen and hydrogen by the hydrolizer apparatus 17 and oxygen goes also to surrounding air 4 through oxygen outlet 14. Hydrogen is led to air extraction unit 33 together with the hydrogen coming from hydrogen separator 15, where oxygen possibly retained in the compound is bound. From here hydrogen gets back to gas container space 1 through lift gas feedback 12.

Figure 4:
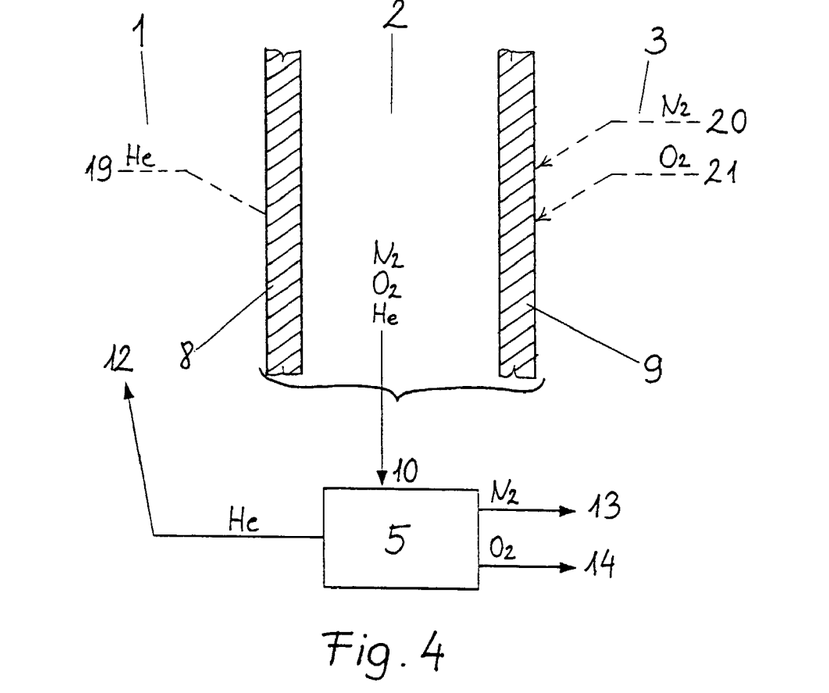
FIG. 4 shows another preferable envelope-structure arrangement of the method according to the invention, where separator space and gas container space can be seen in case of helium gas application.

FIG. 4 shows another preferable envelope-structure arrangement of the method according to the invention, where separator space 2 and gas container space 1 can be seen in case of helium gas 19 application. The method is similar to the most ordinary base method made known in FIG. 1. In the definite case shown in FIG. 4. gas container space 1 contains helium 19, that diffuses to a low extent, but continuously through inner isolation layer 8 towards separator space 2, where it mixes with nitrogen 20 and oxygen 21 gases diffusing through the outer isolation layer 9 from the surrounding air 4. The gas separating apparatus 5 removes the gas-compound from the separator space 2 by continuous exhaustion.

Figure 5:
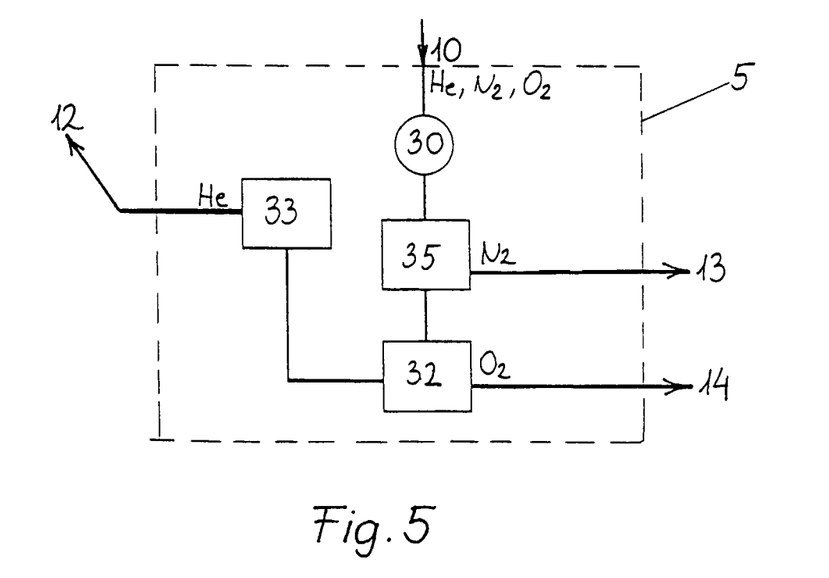
FIG. 5 shows a possible preferable technical solution of the gas separating apparatus shown in FIG. 4.

FIG. 5 shows a possible preferable technical solution of the gas separating apparatus 5 shown in FIG. 4. Here H2+O2+N2 gas-compound risen from separator space 2 is pumped by the gas transferring unit 30 through the gas compound outlet 10 to nitrogen extraction unit 35 and oxygen extraction unit 32. Nitrogen goes to surrounding air 4 through nitrogen outlet 13 and oxygen goes to surrounding air 4 through oxygen outlet 14. The rest of gas compound containing mainly helium is led into air extraction unit 33, where possible remaining air is fixed. The retained helium gets back to gas container space 1 through lift gas feedback 12.

Figure 6:
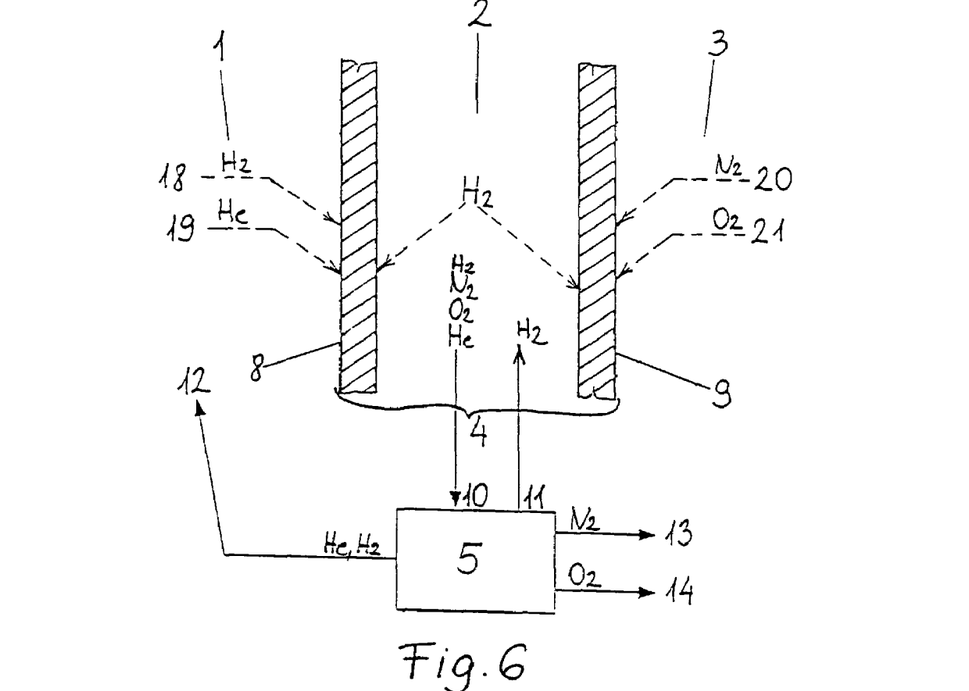
FIG. 6 shows a further preferable envelope-structure arrangement of the method according to the invention in case of hydrogen and helium in the in gas container space, and hydrogen compound base gas in separator space.

FIG. 6 shows a further preferable envelope-structure arrangement of the method according to the invention in case of hydrogen 18 and helium 19 in the in gas container space 1, and hydrogen compound base gas in separator space 2. The method is essentially similar to that of the apparatus seen in FIG. 1 with the difference, that here in the separator space 2 feedback of hydrogen compound base gas takes place. This hydrogen is cleaned from air having diffused from surrounding air 4 into separator space 2, as well as from helium and hydrogen gases coming from gas container space 1 by circulation in gas separating apparatus 5. The gas container space 1 is of 1-10 millibar overpressure compared to surrounding air 4. The pressure of the separator space 2 compared to the gas container space 1 can be either negative or positive, but maximum 0.1-1 millibar overpressure.

Figure 7:
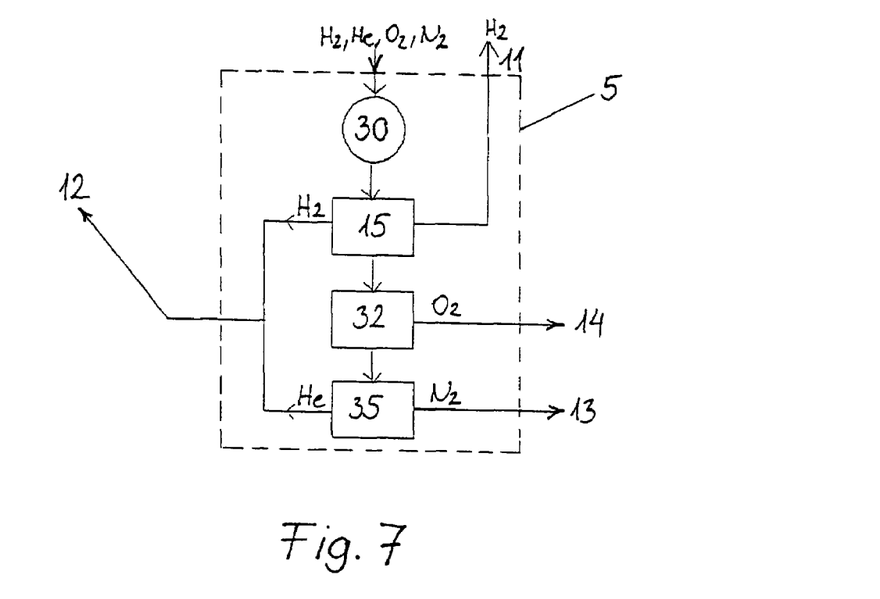
FIG. 7 shows a possibly preferable application of gas separating apparatus in the arrangement shown in FIG. 6 as well as a method.

FIG. 7 shows a possibly preferable application of gas separating apparatus 5 in the arrangement shown in FIG. 6 as well as a method. Here gas compound of H2, He, O2 and N2 gets from separator space 2 into hydrogen separator 15 of adsorption/resorption with palladium powder through gas compound outlet 10 and gas transferring unit 30. The hydrogen extracted here is led partly to gas container space 1 through lift gas feedback 12, partly to separator space 2 through basic compound gas feedback 11. Oxygen is preferably handled in oxygen extraction unit 32 with salcomin powder and forwarded to surrounding air 4. Nitrogen is separated by a nitrogen extraction unit 35 with micro-capillary and sent back to surrounding air 4. After having extracted nitrogen pure helium rest is filled back to gas container space 1 through lift gas feedback 12.

Figure 8:
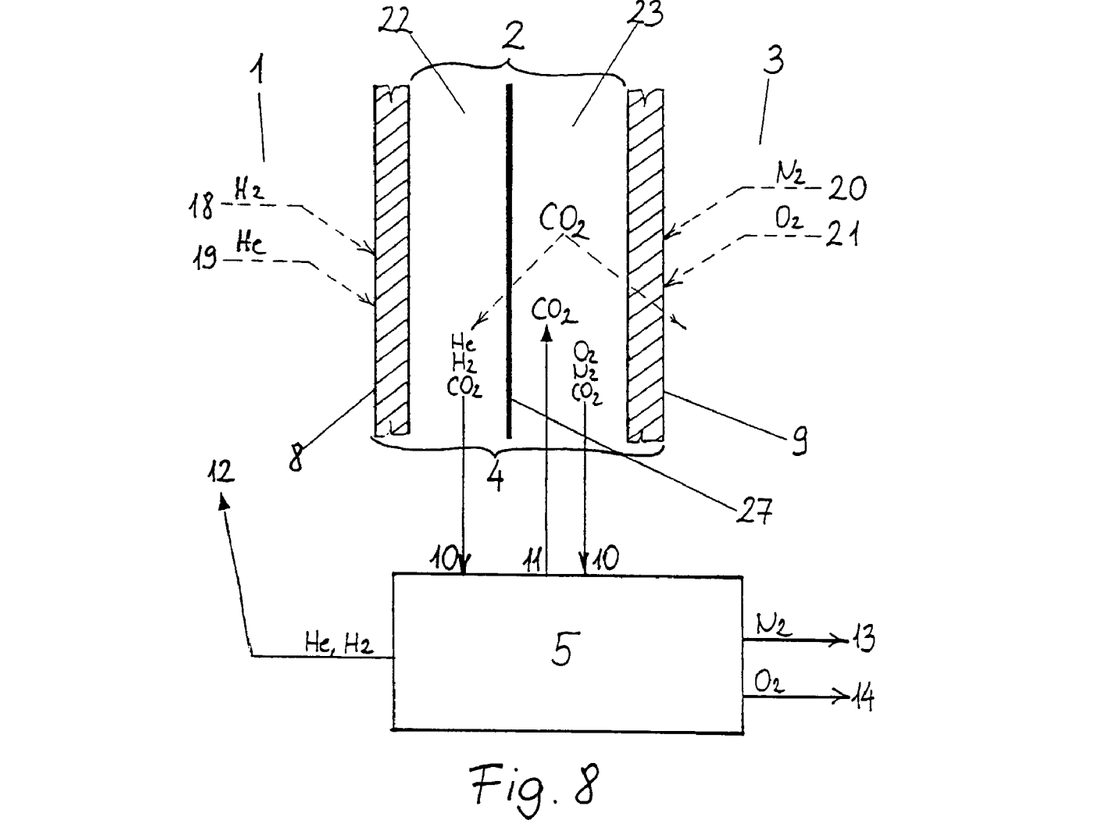
FIG. 8 shows a further preferable envelope-structure arrangement of the method according to the invention in case of two separator spaces, an inner separator space and an outer separator space as well as an interval isolation layer.

FIG. 8 shows a further preferable envelope-structure arrangement of the method according to the invention in case of two separator spaces, an inner separator space 22 and an outer separator space 23 as well as an interval isolation layer 27. This case separator space 2 includes inner separator space 22 and outer separator space 23 as well as an interval isolation layer 27. In gas container space 1 hydrogen and/or helium are applied. In outer separator space 23 preferably CO2 is applied. Here it could be hydrogen as well, respectively other such gas, that can be well handled. In inner separator space 22 only extraction of gas compound by exhaustion is applied, whereas in outer separator space 23 feedback of CO2 compound base gas takes place. In case of arrangement according to FIG. 8 gases diffusing from outer and inner space in separator space 2 divided into two parts cannot mix with each other, but can create a mixture with the carbon-dioxide base gas only. This way we create a well-controllable situation to separate gases coming by diffusion.

Figure 9:
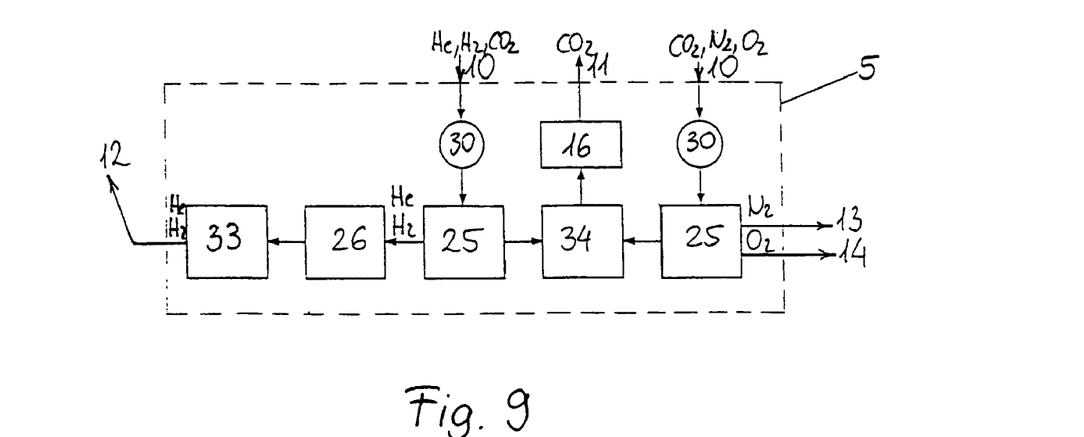
FIG. 9 shows a possible and preferable application of gas separating apparatus in the arrangement shown in FIG. 8 as well as a method.

FIG. 9 shows a possible and preferable application of gas separating apparatus 5 in the arrangement shown in FIG. 8 as well as a method. Here gas compound of H2, He, CO2 gets from inner separator space 22 into carbone-dioxide extraction unit 25 through gas compound outlet 10 and gas transferring unit 30. Carbone-dioxide extracted here gets to CO2 recovering unit 34, then from there to outer separator space 23 through vapor extraction unit 16 and basic compound gas feedback 11. Helium and/or hydrogen gets from carbone-dioxide extraction unit 25 to gas container space 1 through carbone-dioxide filter unit 26 and air extraction unit 33 and via lift gas feedback 12. CO2, N2, O2 gas compound gets from outer separator space 23 to carbone-dioxide extraction unit 25 via gas compound outlet 10 and gas transferring unit 30. Carbon-dioxide extracted here gets to CO2 recovering unit 34, then from there to outer separator space 23 via vapor extraction unit 16 and basic compound gas feedback 11. Oxygen and nitrogen retained as compound are led to surrounding air 4.

Figure 10:
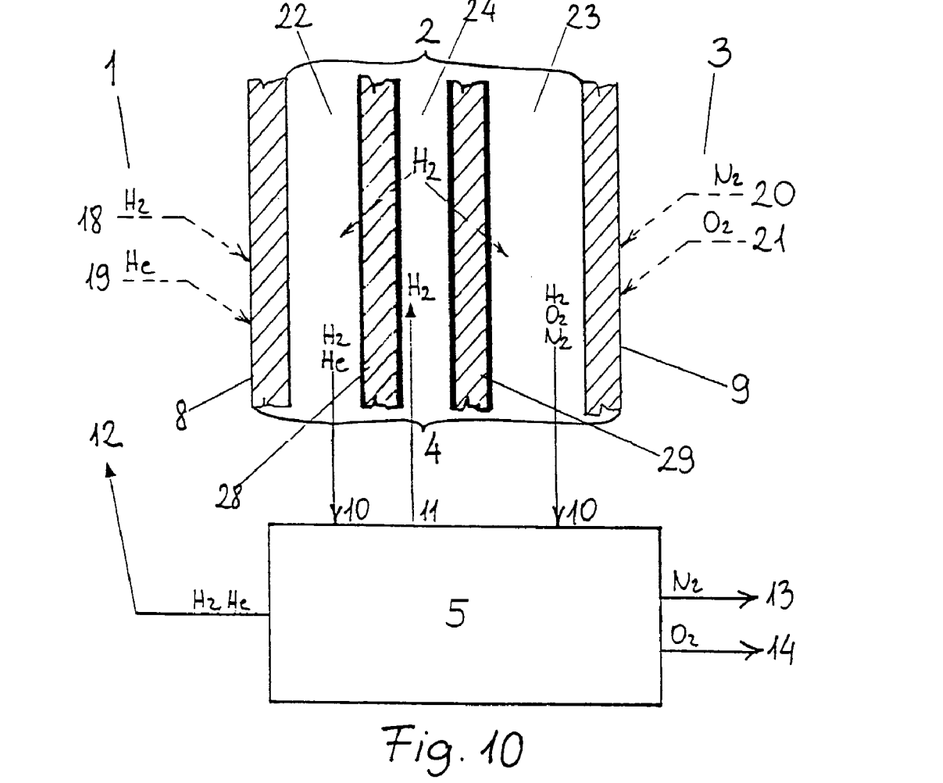
FIG. 10 shows another preferable application of gas separating apparatus arrangement in case of three separator spaces—inner separator space, outer separator space, interval separator space—and two interval isolation layers—inner interval isolation layer and outer interval isolation layer.

FIG. 10 shows another preferable application of gas separating apparatus 5 arrangement in case of three separator spaces—inner separator space 22, outer separator space 23, interval separator space 24—and two interval isolation layers—inner interval isolation layer 28 and outer interval isolation layer 29. Hydrogen gas and/or helium gas are applied in gas container space 1. In interval separator space 24 preferably hydrogen basic compound gas is applied, similarly to FIG. 6. The inner separator space 22, and outer separator space 23 are slightly under vacuum, interval separator space 24 has a 1-10 millibar overpressure compared to the surrounding.

Figure 11:
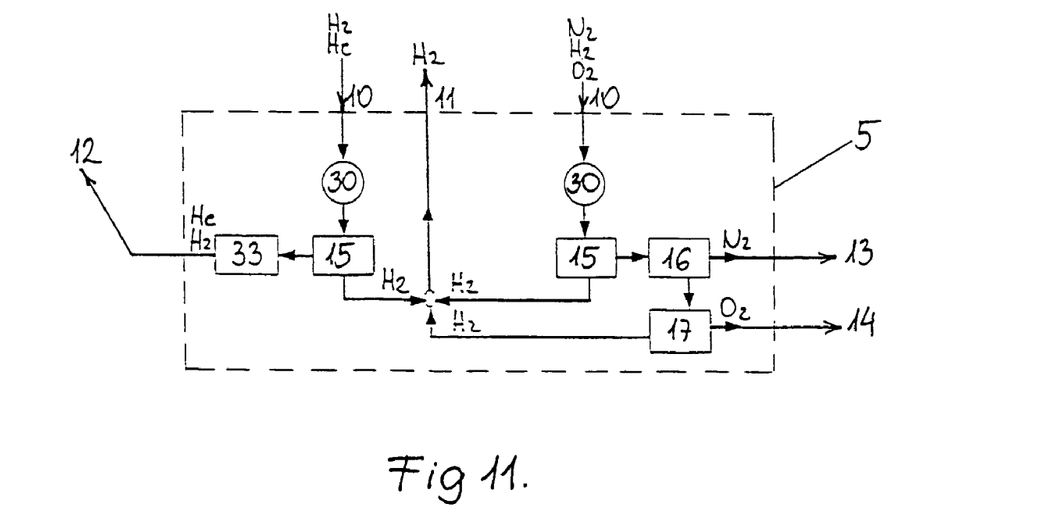
FIG. 11 shows a possible preferable technical application of gas separating apparatus in the arrangement shown in FIG. 10.

FIG. 11 shows a possible preferable technical application of gas separating apparatus 5 in the arrangement shown in FIG. 10. Method of handling of gas is also very similar to that of the description of FIG. 6. Here H2, He gas compound risen in inner separator space 22 is led to hydrogen separator 15 via gas compound outlet 10 and gas transferring unit 30. A great part of helium and hydrogen from hydrogen separator 15 gets back to gas container space 1 via air extraction unit 33 and lift gas feedback 12. The smaller part of extracted hydrogen together with hydrogen extracted elsewhere gets back to interval separator space 24 via basic compound gas feedback 11.

H2, O2, N2 gas compound risen in outer separator space 23 gets to hydrogen separator 15 via gas compound outlet 10 and gas transferring unit 30. In the hydrogen separator 15 oxygen unites with a part of hydrogen and becomes steam. This steam and nitrogen are led to vapor extraction unit 16 after having separated them from hydrogen. From here nitrogen goes to surrounding air 4 via nitrogen outlet 13. Hydrogen is led back together with hydrogen led out from hydrogen separator 15 into basic compound gas feedback 11. The advantage of this arrangement is, that the air of inner gas container space 1 and air from surrounding air 4 cannot even theoretically mix, because there is a hydrogen separating space of overpressure. In addition to that, hydrogen applied as basic compound gas in interval separator space 24 cannot get into surrounding air 4.

Figure 12:
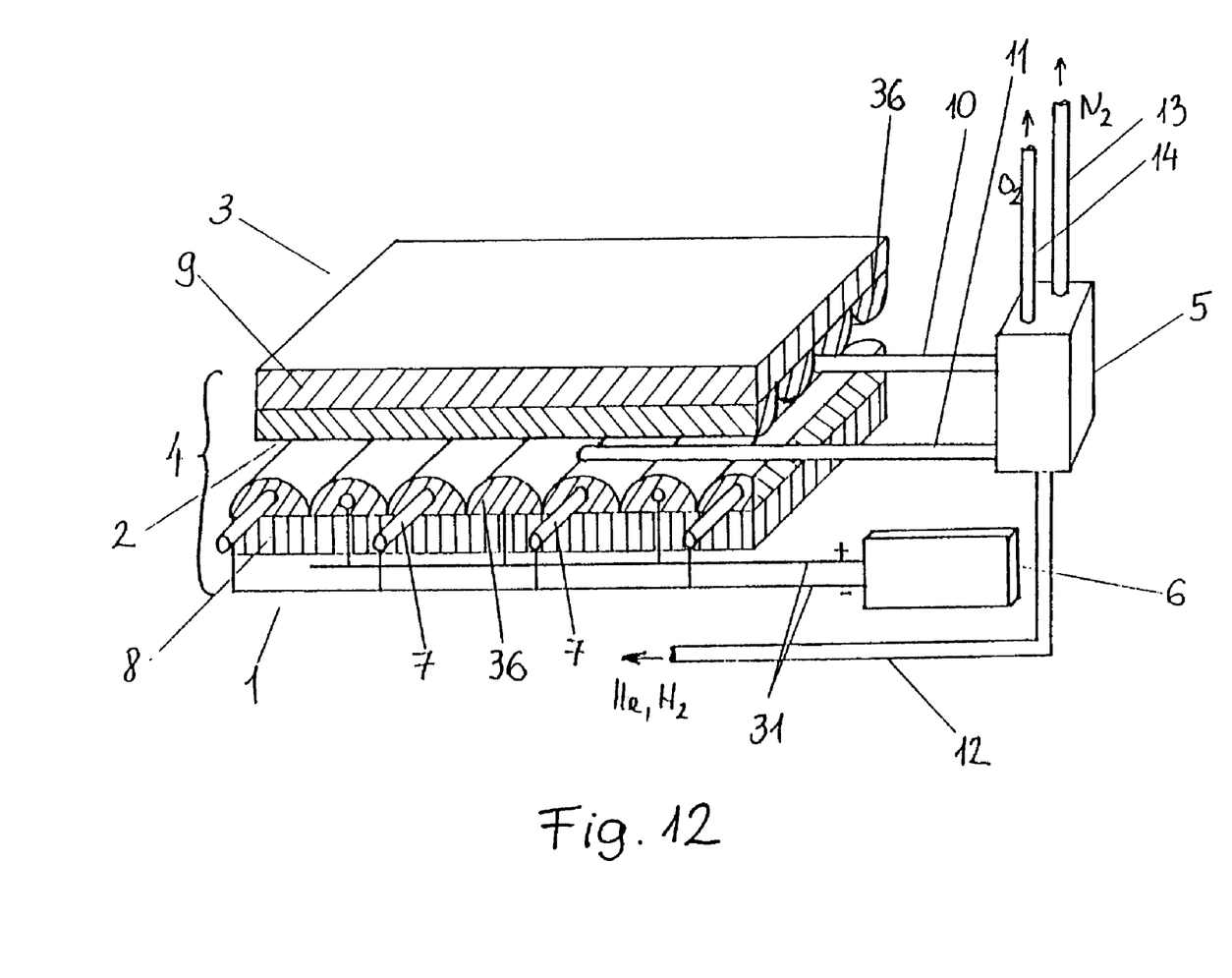
FIG. 12 shows a preferable application of the envelope-structure arrangement as seen in FIG. 2 in case of material layers of micro-rib structure.

FIG. 12 shows a preferable application of the envelope-structure arrangement as seen in FIG. 2 in case of material layers of micro-rib structure. The principle and arrangement of the most simple null-diffusion (ND) envelope with separator space treated in ordinary case by active isolation, shown in FIG. 12 is as follows: The bordering structure consisting of inner isolation layer 8 and outer isolation layer 9 as well as a separator space 2, container wall or envelope 3 is applied between surrounding air 4 (air=nitrogen-oxygen gas compound) and gas container space 1 containing hydrogen or helium. The electrical gas diffusion inhibitor 6 can have effect in inner isolation layer 8 or outer isolation layer 9. This case it is e.g. joined the inner isolation layer 8.

It can be seen in FIG. 12 that for the so-called separating cycle gas separating apparatus 5 extracts gas compound from separator space 2 risen there due to diffusions via gas compound outlet 10, then they are broken down to elements and are sent back to their resources. So e.g. nitrogen and oxygen gets to surrounding air 4 via nitrogen outlet 13 and oxygen outlet 14, helium and hydrogen gets to gas container space 1 via lift gas feedback 12. If basic compound gas is applied, it gets back to separator space 2 via basic compound gas feedback 11.

FIG. 12 shows a possible definite application of electroactive-diffusion inhibitor (EDI). In the given case high voltage of alternative superimposed current is put to DC basic voltage adjusted specially to the given polymer and gas separator space 2. The inner isolation layer 8 in the given case is PVA film of extremely good hydrogen and helium gas isolation characteristics. The said high voltage is connected to metal fibers 7 of 0.05 mm diameter applied to the PVA film with gaps of 0.1 mm as well as to electrical connections 31 marked with + and − polarity. EDI is suitable for decreasing gas diffusion by abt. 40%. Appropriate voltage (1-10 kV) and frequency (100 kHz-1 MHz) values corresponding with different materials of film and composition of gases are to be determined individually in each arrangement.

In a preferable application of the solution according to the invention it can be seen in FIG. 12 as well, that on the inner surfaces the of inner isolation layer 8 and the outer isolation layer 9 micro-ribs of 50 micron radius with semicylinder cross-section are formed lengthwise and in cross direction by e.g. blistering. It can be also seen, that resulting from the above the membranes lain on each other have contact at points only and a separator space 2 of preferably small volume is shaped between them, which can be effectively handled and is suitable for gas flow.

Regarding the principle of the laminated gas envelope, it is a diffusion gas-flow channel, intermittent with separator spaces, which can be handled by various physical-chemical methods. In the structure of the gas balloon envelope there is a separator space, into which well-known, actively operated gas-cleaning separating processes, resp. diffusion-preventive effects can be involved by which e.g. gas-sealing features can be improved. According to the invention the indispensable cleaning of lift gases of airships is not made by conventional methods in the lift gas space and hangar that are difficult to access, but in a much more advantageous way it can be performed in the so-called gas-handling separator space or null-diffusion structure envelope with the help of a board equipment. Our solution of the invention can be interpreted as a gas cleaning on board placed into an envelope, which is combined with the recovery of lift gas as well.

It is characteristic of the technical solution of the envelope structure according to the invention, that the various material membrane layers (inner, outer, interval) have contact with each other through a tiny surface and they are not directly united in the conventional way (rolling, lamination, co-extrusion etc.). Therefore the membrane and film layers can be chosen so, that they fit the given environments optimally. It is also important, because according to experience if two polymer films, e.g. are united in a passive gas-sealing envelope in the traditional way as composites, then the gas-sealing features, which by themselves are quite good, can deteriorate.

It is an important feature as well, that the envelope separator spaces are able to move gases on the whole surface, which is ensured by the smallest possible contact. Possibilities of creating separator spaces with minimum contact are preferable as follows:

creating a relatively great volume of space bordering the gas container space as an envelope. ('a small balloon in a bigger balloon' arrangement)

application of an interval ventilating fabric layer—of microporous structure. This fabric can be the load-bearing basic fabric of the envelope as well.

Laying of blistered material membranes (films) ribbed of distance profile in such a way, that surfaces can have contact on very small edge surfaces or points (see FIG. 12)

Advantageous Applications of the Solution According to the Invention are:

Obviously the materials membrane layers must be chosen from among the best materials available, which can be adjusted to the given outer and inner environment in a passive way as well (heat-resistance, UV resistance, gas sealing etc.). In case of hydrogen filling an inner gas-sealing layer can be for example a polyvinyl-acetate (PVA) film, which is suitable to keep back hydrogen passively as well, which can be cast to metal fabrics necessary for electric diffusion inhibition. Outer gas-sealing layer can be Teflon film of good weather resistance (waterproof, UV and ozone-friendly) e.g. catoptric poly-chlor-trifluor-ethylene (PCTFE) resistant to rhodium or cosmic radiation with gold fibers.

Layers of space and materials could both be handled in the envelope with separator space. As a structure, the envelope can contain distance-keeping materials able to ventilate and basic compound gas, which can be of negative or positive pressure compared to the environment. It is preferable to apply negative pressure compared to the environment in the envelope in order to diminish gas loss of basic compound gas as well as improve mechanical properties. Enclosed FIG. 12 shows characteristic structural features of envelope with separator space and operation of active isolation. It can be seen in FIG. 12, that the envelope is appropriately structurized, laminated and distanced with microribs, as well as that with processes of connected effects—for example the materials layer is handled with electrical gas diffusion inhibitor (EDI) as well as disjunctive gas separation (DS).

Partial Processes of the Method According to the Invention

Electrical Gas diffusion inhibition (EDI)

EDI is a physical effect, applied in materials membrane layers, which is able to decrease absorption and penetration of gases. Its principle is, that gas permeability of polymer films used as condensers can be changed by alternating voltage (2-10 kV) put on the armature, depending on frequency (100 kHz-1 MHz). EDI can be mainly applied in bipolar polymers, e.g. PVC, PVA. However if the surface layer (crystallites, chain segments) of an originally nonpolar polyethylene film is made dipole by silent discharge, then EDI can be applied effectively in these films as well. This surface treating method is generally applied to make nonpolar polymers printable.

Disjunctive Separation (DS)

DS is a physical and/or chemical action, during which gases are separated by a disjunctive separation from the mixture of these separator spaces and are forwarded back to their sources. The gases having penetrated into the separator space or spaces—created as described above—even in small quantities, reduced by EDI—forming gas compound there,—are extracted, separated and forwarded back to their sources, by well-known, suitably adapted gas-handling methods and equipment, or in an other way, (for example by piping them into a fuel cell) are utilized.

As gas diffusion through polymer membrane isolation still takes place despite EDI (6), it is necessary to apply a separator space in the envelope acting as a 'diffusion gas trap' breaking the diffusion micro-channels of the material-membrane layers of the envelope, which can be treated by various processes. The diffusion gases going out of the gas container space/lift gas space as well as gases coming from the surrounding are mixed with each other and/or the basic compound gas in the interval isolation layer.

If however this gas compound created in the isolation layer is treated by a gas-handling equipment using suitable methods in a way, that e.g. the components of the compound are extracted and forwarded back to their resources, it can be achieved, that the filling gas should not get to the surrounding air and so should not get lost, because the filling gas extracted from the isolation layer can be forwarded back to the gas container space/lift gas space. In a similar way gases diffusing inside from the surrounding air can not directly get into the gas container space/lift gas space and create there a compound of low concentration. Methods so-called on board gas-cleaning processes applied so far are not efficient, because small quantities of diffusion contamination must be handled by moving an enormous quantity of gas and using extremely subtle separation methods.

However according to our invention only the quantity of gas diffused into the envelope from two directions must be handled. The active isolation separator space formed in the envelope is of small volume, so the small quantity of diffusing gas is of significant percentage proportion, so can be handled more easily. The null-diffusion (ND) envelope according to our invention can be regarded as a gas-cleaning made more efficient by locating it into the envelope, combined with the recovery of lift-gas as well.

Possibilities of Gas Separation in Disjunctive Gas Handling:

Liquefaction and fractional distillation are general methods for separation of every gas.

Hydrogen Separation Possibilities:

Adsorption in palladium or nickel metal-powder or chip (1 cm3 Pd can fix 1000 cm3 hydrogen.) Hydrogen can be easily recovered from the metals by heating. Hydrogen can easily penetrate through heated palladium membrane, whereas other gases cannot. In the presence of palladium catalyzator hydrogen can be united with oxygen into water, and can be extracted from the gas compound. The extracted water can be decomposed by electric current to hydrogen and oxygen and can be separated. Hydrogen can be extracted by leading through a so-called fuel cell producing on board electric energy as well.

Oxygen Separation Possibilities:

Oxygen can be adsorbed by salcomine and can be extracted by heating. Oxygen being of paramagnetic character can be diverted in strong magnetic field and can be extracted from a slow gas-flow.

Oxygen can be absorbed in a pyrogallol solution, but this solution can not be easily recovered. Therefore it is rather used after filtering. It is a special advantage, that appearance of oxygen is shown by the discoloration of the solution. Oxygen can be fixed by calcium at higher temperature.

Carbon-Dioxide Separation Possibilities:

Carbon-dioxide can be absorbed by a potassium carbonate solution from the gas compound, and then can be extracted by boiling.

Carbon-dioxide can also be fixed by sodium hydroxide. This case however sodium carbonate is created as well, which is difficult to change back into sodium hydroxide, so it is mainly suitable for after filtering.

Nitrogen Separation Possibilities:

Zepp-Innert type capillary membrane separator produced by Zeppelin is suitable for nitrogen separation.

Nitrogen unites with metal lithium at room-temperature too. However this reaction is not reversible, so it can be use for after filtering only.

Nitrogen can be chemically fixed with calcium at higher temperature and can be recovered as ammonia. Remaining calcium compound can be recovered by electrolysis in the dry way.

Description of a few preferable definite technical applications of the method and apparatus according to the invention:

In one case a separator space is used to separate the gas container space from the environment and there is hydrogen filling gas in the lift-gas space. The gas in the outer space is air, that is compound of nitrogen and oxygen.

There is no basic compound gas in the separator space, instead continuous or intermittent suction (vacuuming) is applied. Due to diffusion through separation isolation material membrane layers gases get into the separation space both from the surrounding air and gas container space, so a gas compound of hydrogen+nitrogen+oxygen is created there. The gas compound of the separator space is treated in an active way in the gas-treater, so that it is led into a glowing palladium membrane through a suction pipe and membrane compressor.

The steam+nitrogen residue from the primary membrane (from gas compound) side is fixed through a silica gel extracting steam, nitrogen can leave for the surrounding air through an outlet pipe. Water extracted from silica gel by heating and condensation is decomposed in hydrolizer apparatus to hydrogen and oxygen. Finally hydrogen led into the gas container space/lift gas space through a back pipe oxygen is let into the surrounding air through oxygen outlet.

In case of another preferable application the gas in the lift-gas space is helium. One vacuumed separator space without basic gas compound is applied between the lift-gas space and the environment. Then helium, nitrogen and oxygen is created in the separator space. During disjunctive separation process firstly oxygen is extracted by fixing on a salcomin adsorbent, then nitrogen and helium are separated from each other, e.g. by nitrogen generator Zepp-Innert type capillary membrane separator produced by Zeppelin. Obviously all the components of the compounds are led back to their resources. After salkomin adsorbtion unit and nitrogen generator a glowing calcium—oxygen and nitrogen—after filtering is applied.

In another preferable application in the null-diffusion envelope according to the invention two isolation layers are used, and the lift-gas space is filled with hydrogen and/or helium. The inner separation space is vacuumed appr. 100 mbar. The outer isolation layer is filled with carbon dioxed basic gas compound and is of −10 mbar pressure. The outer environment is air. In this arrangement a gas of much easier handling, carbon dioxide diffuses into the inner isolation layer instead of nitrogen and oxygen. It has essentially such an effect, as if the balloon of one inner separation space was put into carbon dioxide environment.

So from the lift-gas space helium or hydrogen diffuses to the inner separator space, and carbon dioxide diffuses from the outer separator space into inside. The first element of the gas-handling equipment is a compound membrane compressor working intermittently, which pumps out the carbon dioxide+hydrogene and/or helium compound from the inner separator space. Then carbone-dioxide is adsorbed in a potassium carbonate adsorber unit solution, then an after-filtering by solid sodium hydroxyde unit follows. At the end of the cycle traces of nitrogen and oxygen are extracted by leading them through a glowing calcium unit. Lift-gas (hydrogen/ helium) left chemically-pure is led back into the gas container space via lift-gas feedback. Finally carbone-dioxide is boiled from potassium hydrocarbonate solution in an extraction unit, led through a vapor extraction silica gel and fed back into the outer separator space.

From the carbone-dioxide+(nitrogen+oxygen) compound rising in the outer separator space carbone-dioxide is extracted by potassium-carbonate chemosorption, then after boiling it is led back into the outer envelope space. Nitrogen and oxygen not extracted from the compound are led into surrounding air.

The drawback of such an envelope with two separator spaces is, that a minimal quantity of carbone-dioxide can diffuse continuously to the surrounding air via the outer surface of the envelope—even opposite the pressure gradient—, and this loss must be balanced from time to time. Accordingly any other gas can be applied in the outer separator space. For example oxygen, hydrogen or ammonia extractable from the environment by salcomine. In these cases the appropriate gas separation methods must be applied in the apparatus.

In case of another preferable application of the method according to the invention in case of active isolation envelope structure three separator spaces are applied and the filling of the lift-gas is helium. The outer and inner separator space are vacuumed, the value is 100 mbar. The so-called interval separator space between the two of them is of 10 mbar vacuum value and contains hydrogen.

The surrounding air is a compound of nitrogen and oxygen. The hydrogen, diffused from the interval separator space as well as from the gas compound risen in the inner and outer separator space is separated by leading through a glowing palladium membrane and the residual (remnant) gases are led back to their resources.

So the helium is led back from the inner separator space via calcium filter through feedback pipe to the lift-gas space. From the compound of the outer separator space oxygen and hydrogen become water in the glowing palladium unit.

The steam risen on the primary side is fixed by a silica gel adsorbent, the residual nitrogen is led through an outlet into the surrounding air. The chemically-pure hydrogen penetrated through the glowing palladium membrane is led into the interval isolation space.

If hydrogen is separated from water fixed on silica gel by electric hydrolysis, then it can be fed back into the interval separator space. Active isolation (null-diffusion) envelope of this arrangement has no gas loss either. It can be applied for this arrangement as well, that other gases of easy handling, e.g. oxygen can be used in the interval separator space as well, using gas-handling apparatus compiled accordingly.

Advantages of the Solution According to the Invention:

The so-called null-diffusion envelope structure according to the invention with intermittent separator space, treated with active methods can prevent loss of diffusible filling gases (hydrogen and helium) of gas balloons and diffusion of surrounding gases to the gas container space for years.

Furthermore it is possible only with the use of null-diffusion envelopes to make balloon structures without filling gas loss, capable for lifting without limit, which can be safely filled with hydrogen as well.

Further advantages of the application of the invention are as follows:

Considerable overpressure can be applied in the lift space. The envelope can be made aerodynamically advantageously rigid by a frame system of high dead load, or applying overpressure in the lift space. Overpressure in the lift space increases diffusion of filling gas, which can only be prevented by the active isolation increasing the strength of the envelope as well, according to the invention.

It improves profitability and safety. Active isolation envelope makes unnecessary additional supply of expensive filling gases e.g. helium, improving profitability considerably. In case of hydrogen filling it prevents creation of flammable compounds due to preventing oxygen penetration. It also highly increases safety.

It makes possible safe storing of hydrogen as fuel. It also makes possible, that lifting bodies of helium lift-gas can include appr. 15-20% of hydrogen as fuel gas in inner balloonets, or diffused.

The solution according to the invention makes unnecessary the cleaning of the lift-gas space. Application of small dead load and low fuel consumption board envelope treating apparatus makes unnecessary regular lift-gas space cleaning, which could be performed so far in hangars only.

The solution according to the invention makes possible, that the envelope faults (holes) can be indicated, localized. The perforation faults (holes) of the envelope can be exactly localized and mended even in case of a fully equipped balloon.

LIST OF REFERENCES:

1—gas container space
2—separator space
3—envelope
4—surrounding air
5—gas separating apparatus
6—(electrical) gas diffusion inhibitor
7—metal fibers
8—inner isolation layer
9—outer isolation layer
10—gas compound outlet
11—basic compound gas feedback
12—lift gas feedback
13—nitrogen outlet
14—oxygen outlet
15—hydrogen separator
16—vapor extraction unit
17—hydrolizer apparatus
18—hydrogen gasfilling
19—helium gasfilling
20—nitrogen
21—oxygen
22—inner separator space
23—outer separator space
24—interval separator space
25—carbone-dioxide extraction unit
26—carbone-dioxide filter unit
27—interval isolation layer
28—inner interval isolation layer
29—outer interval isolation layer
30—gas transferring unit
31—electrical connection
32—oxygen extraction unit
33—air extraction unit
34—CO2 recovering unit
35—nitrogen extraction unit
36—microrib

The invention claimed is:

1. A method for handling gas diffusion through an envelope of an airship or balloon or hose-container, wherein the envelope is a multilayer envelope comprising at least one separator space, the method comprising, separating gases to their components which gases have penetrated from a gas container space and from surrounding air into the at least one separator space, and I) returning the separated gases back to their initial sources, and/or II) applying electrical gas diffusion inhibition to at least one layer of a material membrane forming the at least one separator space.

2. A method according to claim 1, wherein gases penetrated into the at least one separator space are separated by disjunctive separation.

3. A method according to claim 1, wherein the separated gases are piped into a fuel cell.

4. A method according to claim 1,
wherein the envelope is an active isolation envelope and contains three separator spaces, and
wherein the gas container space is filled with helium,
or
wherein the envelope is a null-diffusion envelope and contains two separator spaces, and
wherein the gas container space is filled with hydrogen and/or helium.

5. A method according to claim 1, wherein at least one of the layers of the envelope is a static and/or alternating current potential space, optionally a gas diffusion inhibitor and optionally applying gas absorption and/or gas penetration.

6. A method according to claim 1, wherein vacuum gas-compound extraction is performed in at least one of the separator spaces.

7. A method according to claim 1, wherein a basic compound gas of positive or negative pressure is applied as intermediate gas-trap in at least one of the separator spaces.

8. A method according to claim 1, wherein gases penetrated into the at least one separator space are separated by adsorption, chemo-sorption, perm-selective membranes, liquefaction, or fractional distillation.

9. A multi-layer gas isolation envelope of an airship or balloon or hose-container for handling gas diffusion, comprising
at least one separator space, and
I) a gas separating apparatus, an inlet of which is connected to at least one separator space, and an outlet of which is connected to a gas container space allowing the return of a separated gas to the gas container space, and another outlet of which is connected to the surrounding air, and/or
II) an electrical gas diffusion inhibitor in or on at least one layer of a material membrane forming the at least one separator space.

10. An envelope according to claim 9, wherein in the envelope there are three isolation material layers and these layers constitute two, an inner and an outer separator spaces, thereby the layers forming a multi-layer closed envelope around a gas container space, and an inlet of the gas separating apparatus is connected to a gas compound outlets of the inner and outer separator spaces, and a gas feedback of the gas separating apparatus is connected to an outer separator space.

11. An envelope according to claim 9, wherein in the envelope there are four isolation material layers and these layers constitute three, an inner, an outer and an interval separator spaces, thereby the interval separator space is located between the inner and the outer separator spaces, and an inlet of the gas separating apparatus is connected to a gas compound outlets of the inner and outer separator spaces, and a gas feedback of the gas-separating apparatus is connected to the interval separator space.

12. A method according to claim 1, wherein the envelope comprises two or more separator spaces to which a gas separator is attached, and wherein the gas in the gas container space is hydrogen and/or helium.

13. A method according to claim 1, wherein the gas container space is filled with hydrogen, and wherein hydrogen is separated from the gases from the at least one separator space by a perm-selective membrane, optionally by conduction of the hydrogen through a glowing palladium membrane or by adsorption or chemo-sorption.

14. A method according to claim 1, wherein the gas container space is filled with helium, and wherein the helium is separated from the gases from the at least one separator space in a way that other gas components are separated to achieve the helium as residuum gas.

15. A method according to claim 1, wherein I), the separated gases are returned back to their initial sources.

16. A method according to claim 1, wherein II) electrical gas inhibition diffusion is applied to at least one layer of a material membrane forming the at least one separator space.

17. A multi-layer gas isolation envelope according to claim 9, which comprises I) a gas separating apparatus, an inlet of which is connected to at least one separator space, and an outlet of which is connected to a gas container space allowing the return of a separated gas to the gas container space, and another outlet of which is connected to the surrounding air.

18. A multi-layer gas isolation envelope according to claim 9, which comprises II) an electrical gas diffusion inhibitor in or on at least one layer of a material membrane forming the at least one separator space.

19. A method for handling gas diffusion during storage of a gas through an envelope of a gas storage container, wherein the envelope is a multilayer envelope comprising at least one separator space, the method comprising, separating gases to their components which gases have penetrated from a gas container space and from surrounding air into the at least one separator space, and I) returning the separated gases back to their initial sources, and/or II) applying electrical gas diffusion inhibition to at least one layer of a material membrane forming the at least one separator space.

20. A method according to claim 19, wherein the gas is hydrogen fuel.

* * * * *